United States Patent [19]

Fukushima et al.

[11] Patent Number: 5,270,936
[45] Date of Patent: Dec. 14, 1993

[54] SIMPLIFIED NAVIGATION APPARATUS

[75] Inventors: Atsuhiko Fukushima; Takashi Kashiwazaki, both of Kawagoe; Morio Araki; Satoshi Odagawa, both of Kawaoge; Kazuhiro Akiyama, Kawagoe, all of Japan

[73] Assignee: Pioneer Electronic Corporation, Tokyo, Japan

[21] Appl. No.: 949,378

[22] Filed: Sep. 23, 1992

Related U.S. Application Data

[63] Continuation of Ser. No. 567,052, Aug. 14, 1990, abandoned.

[30] Foreign Application Priority Data

Sep. 5, 1989 [JP] Japan ................................ 1-230037

[51] Int. Cl.$^5$ ............................................. G01C 21/00
[52] U.S. Cl. ...................................... 364/444; 340/988
[58] Field of Search ............... 364/449, 454, 444, 447; 340/988, 995; 342/357, 457

[56] References Cited

U.S. PATENT DOCUMENTS

| | | | |
|---|---|---|---|
| 4,367,453 | 1/1983 | Kuno et al. | 364/449 X |
| 4,646,089 | 2/1987 | Takanabe et al. | 364/449 X |
| 4,677,563 | 6/1987 | Itoh et al. | 364/449 |
| 4,737,927 | 4/1988 | Hanabusa et al. | 364/443 |
| 4,954,959 | 9/1990 | Moroto et al. | 364/449 |

Primary Examiner—Jack B. Harvey
Assistant Examiner—Edward Pipala
Attorney, Agent, or Firm—Keck, Mahin & Cate

[57] ABSTRACT

A navigation apparatus having a GPS receiver obtain coordinates of the current position. A key point or points close to the current position are retrieved from a recording medium attached to the apparatus. The distance and direction from the current position with respect to the retrieved point are computed. The name of the retrieved point is then displayed along with the distance and direction with respect thereto.

4 Claims, 4 Drawing Sheets

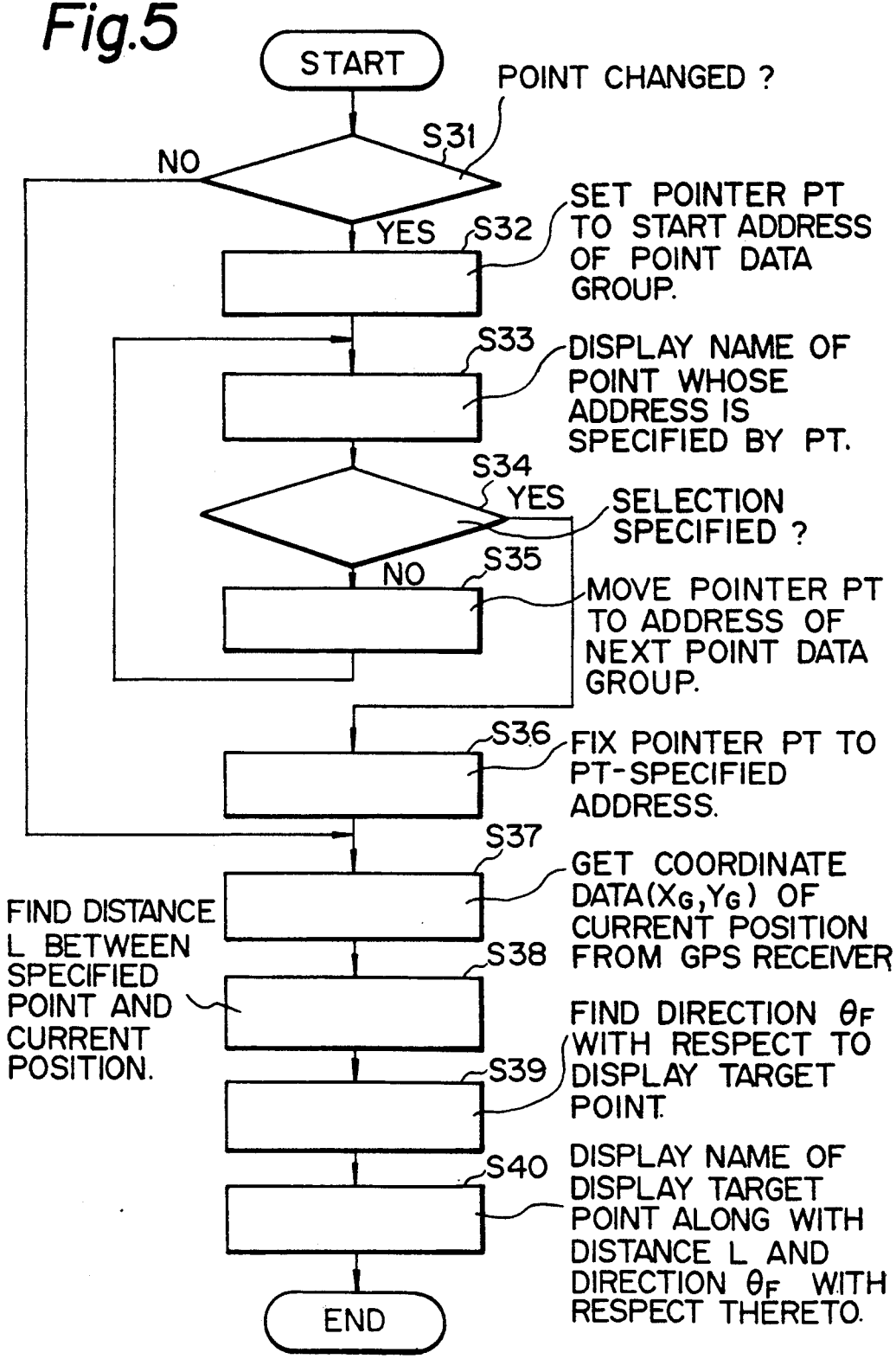

SIMPLIFIED NAVIGATION APPARATUS

This is a continuation of application Ser. No. 07/567,052, filed Aug. 14, 1990, now abandoned.

BACKGROUND OF THE INVENTION

1. Field of the Invention

The present invention relates to a navigation apparatus.

2. Description of the Related Art

In recent years, navigation apparatus for use on board vehicles have been developed and commercialized. These apparatus operate on the following principles: A number of strategic points in given geographical areas are coded in number to form road maps. The maps are stored in a recording medium such as a CD-ROM for use with the navigation apparatus on board the vehicle. The onboard apparatus recognizes the current location of the vehicle using outputs from its distance and direction sensors, while reading from memory groups of road map data applicable to the area in which the vehicle is currently located. The appropriate area map is displayed on a display device, automatically showing the current position of the vehicle.

This kind of prior art navigation apparatus is constructed to display the current vehicle location relative to the appropriate road map data. This requires installing a mass storage medium in which to store road map data and a high-resolution display device on which to display area maps. Also needed are sophisticated computations to be carried out for such applications as plotting of maps and estimation of the current location. These requirements have amounted to construction of the conventional navigation apparatus, few of which are small in size or low in cost. While the exact current position of the vehicle can be known with the apparatus displaying the position relative to the appropriate road map data, some users may find such display containing too much information. It sometimes takes only a limited amount of information about the current vehicle position for most vehicle drivers to reach their destinations.

SUMMARY OF THE INVENTION

It is therefore an object of the present invention to provide a simplified navigation apparatus which is small in size, low in cost and easy to use.

To achieve the foregoing and other objects in accordance with the purposes of the present invention, as embodied and broadly described herein, the simplified navigation apparatus according to the invention comprises: a GPS receiver for outputting coordinate data representing the absolute current location of a vehicle; a reading means for reading from a recording medium a plurality of geographical point data groups contained therein, each data group comprising point name data paired with coordinate data; a display means for displaying display information signals supplied thereto; a display point setting means for detecting coordinate data on a given geographical point from among the plurality of geographical point data groups and setting the coordinate data for the display target point; a reading control means for controlling the reading means so as to retrieve from the recording medium the point name data paired with the coordinate data on the display target point; a computing means for obtaining the data on the distance and direction to the display target point based on the coordinate data both on the current position and on the display target point; and a display control means for supplying the display means with the point name data, distance data and direction data on the display target point as the display information signals.

The recording medium used by the simplified navigation apparatus according to the invention contains beforehand the multiple geographical point data groups each of which comprises point name data paired with coordinate data on each geographical point. In operation, the coordinate data of a given point is retrieved from among the multiple point data groups stored in the recording medium, and is set as the coordinate data about the display target point. Then the distance and the direction between the display target point and the current vehicle position are acquired. Thereafter, the name of the target point is displayed along with the distance and direction with respect thereto.

BRIEF DESCRIPTION OF THE DRAWINGS

FIG. 5 is a flowchart illustrating the steps that the CPU of the embodiment takes in performing yet another type of navigation processing.

DETAILED DESCRIPTION OF PREFERRED EMBODIMENTS

The preferred embodiment of the present invention will now be described in detail by referring to the accompanying drawings.

Figure 1:
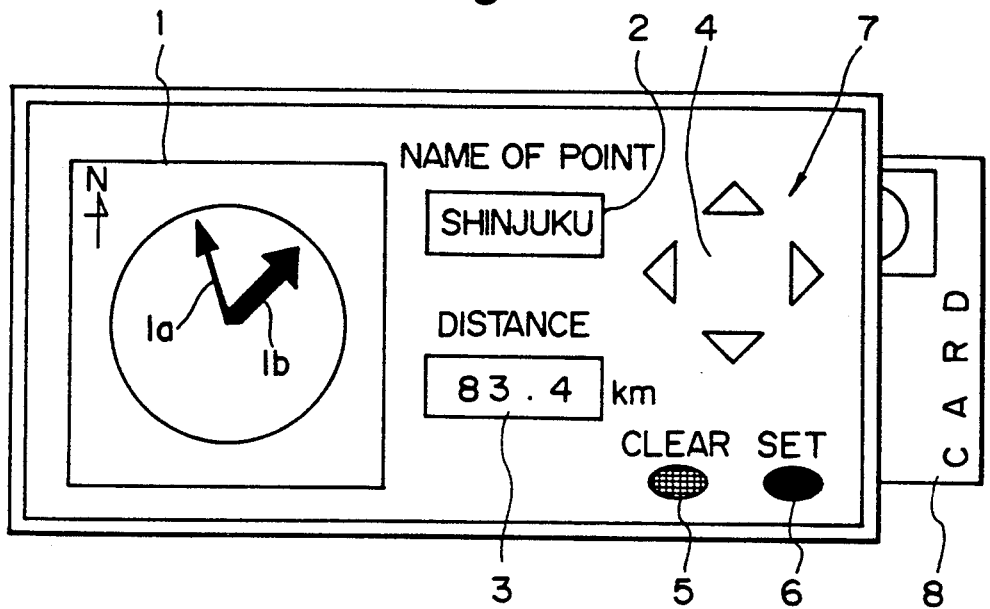
FIG. 1 is an external view of a preferred embodiment of the simplified navigation apparatus according to the present invention.
Figure 2:
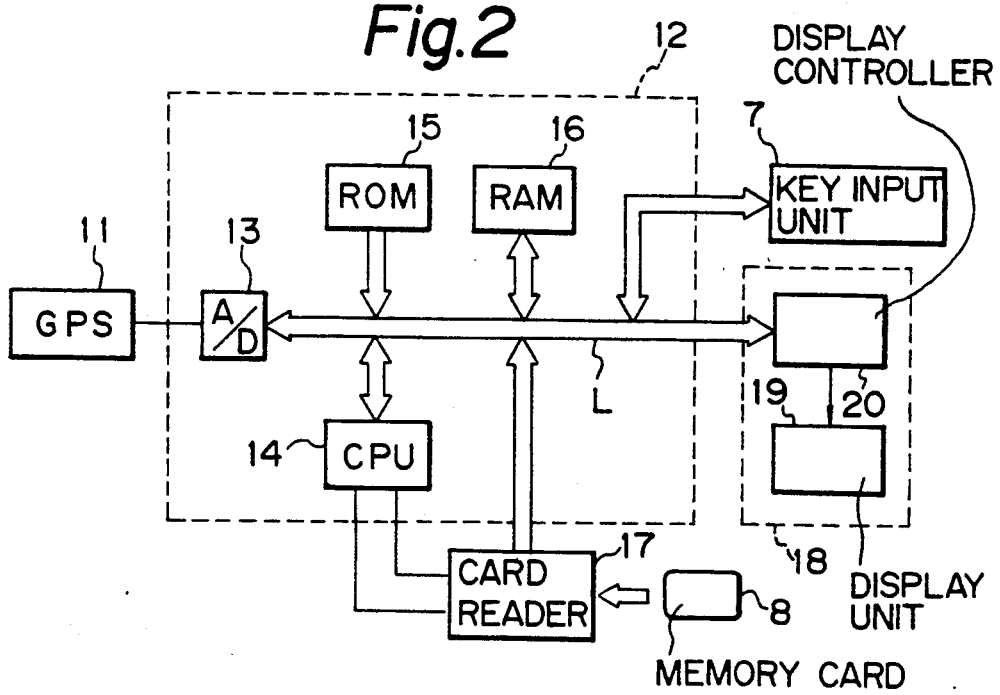
FIG. 2 is a block diagram of a control system in the embodiment.

FIG. 1 shows how the simplified navigation apparatus according to the invention looks in appearance. In FIG. 1, the front of the apparatus contains a direction display unit 1 whose top points to north. A point name display unit 2 and a distance display unit 3 constitute a display unit. A key input unit 7 comprises CURSOR keys 4, a CLEAR key 5 and a SET key 6. Inside the apparatus are a memory card 8, a card reader 16 and a system controller 12, as shown in FIG. 2. The card reader 17 reads information from the recording medium such as the memory card 8.

In FIG. 2, which illustrates the construction of the control system for the navigation apparatus, reference numeral 11 is a GPS (global positioning system) receiver that outputs coordinate data representing the absolute current position of the vehicle equipped with the apparatus. The output of detection by the GPS receiver 11 is supplied to the system controller 12. The system controller 12 comprises an A/D (analog-to-digital) converter 13 that digitizes the output of the GPS receiver 11, a CPU (central processing unit) 14 that performs diverse kinds of control and computation, a ROM (read only memory) 15 that contains various processing programs for use by the CPU 14 as well as other necessary information, and a RAM (random access memory) 16 to and from which the data needed for program execution is written and read.

As indicated, the recording medium may illustratively be the memory card 8. The memory card 8 contains in advance a plurality of geographical point data groups each of which comprises point name data paired with coordinate data about each key point. The data in the card 8 is read by the card reader 17. The contents read by the card reader 17 are placed onto bus lines L, and are temporarily stored in the RAM 16 as needed.

The CPU 14 controls the card reader 17 so that relative to the coordinate data about the current position based on the output data from the GPS receiver 11, the coordinate data of a close key point is detected from among the multiple point data groups in the memory card 8 together with the name data about the detected key point. Furthermore, the CPU 14 acquires the distance and direction from the current position with respect to the detected point using both the coordinate data about the current position and the coordinate data about the detected point. Under control of the CPU 14, a display device 18 is supplied display information signals with the point name data, distance data and direction data thus acquired.

The display device 18 comprises a display unit 19 and a display controller 20. The display unit 19 contains the direction display unit 1, the point name display unit 2 and the distance display unit 3, as shown in FIG. 1. Under control of the display controller 20, the directional display unit 1 displays both the direction of the current progress of the vehicle (1a) and the direction from the current position with respect to the closest key point (1b), the point name display unit 2 displays the name of the closest key point, and the distance display unit 3 displays the distance from the current position up to that closest point.

Figure 3:
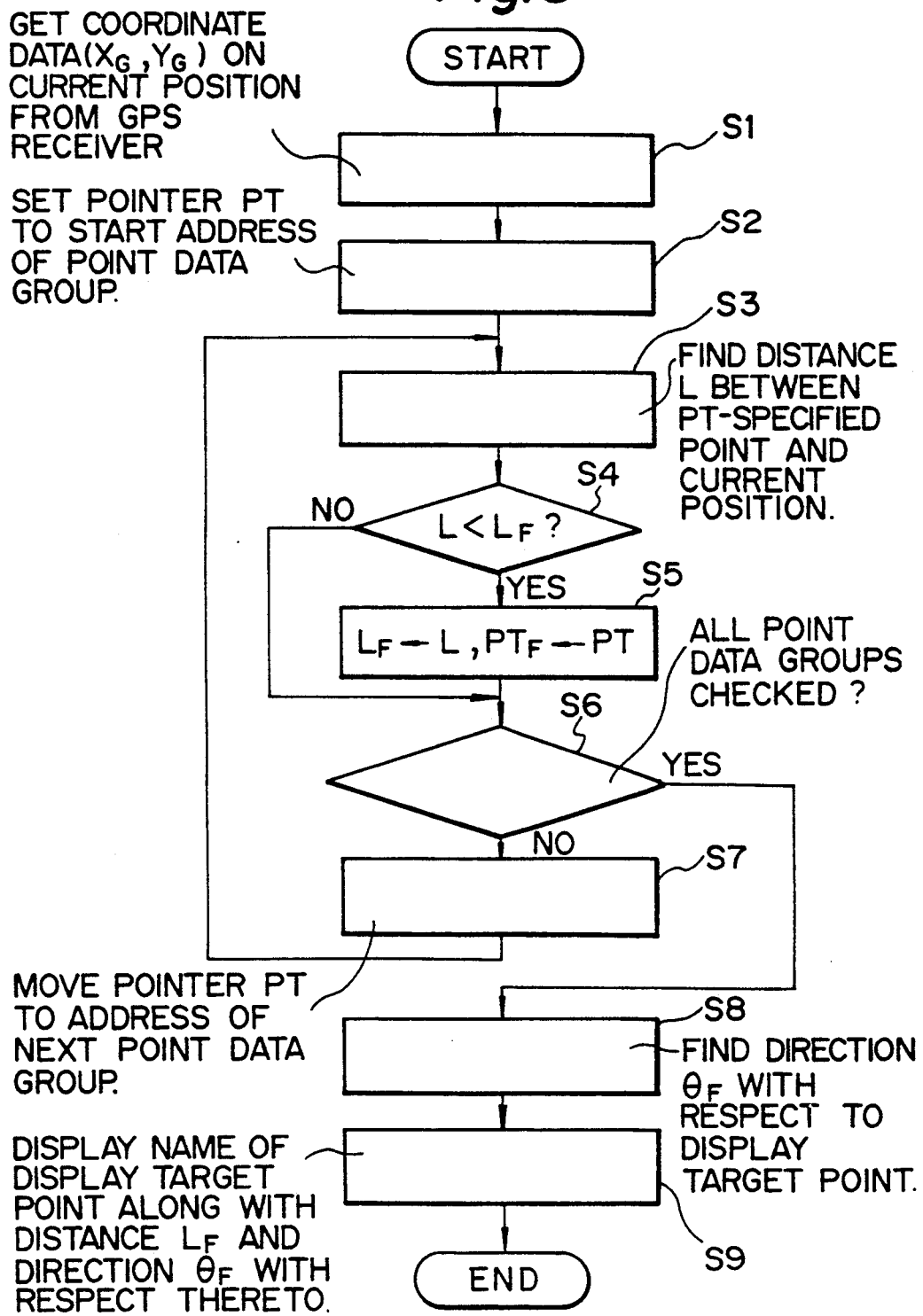
FIG. 3 is a flowchart showing the steps that the CPU of the embodiment takes in performing one type of navigation processing.

One type of navigation processing performed by the CPU 14 will now be described by referring to the flowchart of FIG. 3. The steps involved may be illustratively executed every time the GPS receiver receives its signals. In step S1, the CPU 14 gets from the GPS receiver 11 the longitude and latitude information ($X_G$, $Y_G$) representing the current vehicle position. In step S2, a pointer (PT) is set to the first address for those data groups in the memory card 8 which stand for a plurality of close key points. In step S3, the CPU 14 acquires a distance L between the current position and the key point specified by the pointer through the use of the operation expression:

$$L = \sqrt{(X_G - X_P)^2 + (Y_G - Y_P)^2}$$

where, ($X_p$, $Y_p$) is the coordinate data on the key point obtained from the address pointed to by the pointer, and ($X_G$, $Y_G$) is the coordinate data on the current position. In step S4, a check is made to see if the distance L is smaller than a fixed value $L_F$.

If $L < L_F$, the CPU 14 regards the acquired distance L as the fixed value $L_F$ and fixes the pointer (PT) to the pointer-specified address in step S5. In step S6, a check is made to see if the distance from the current position has been obtained regarding all point data groups. If the distance has not been acquired relative to all point data groups, the pointer is moved to the address of the next point data group in step S7. The CPU 14 then returns to step S3. This process is repeated until the key point closest to the current vehicle position is detected as the display target point. If $L \geq L_F$ in step S4, the processor goes direct to step S6.

In step S6, if the check has proved that the distance from the current position has been acquired relative to all the point data groups, the CPU 14 obtains in step S8 the direction $\theta_F$ with respect to the pointer-specified display target point using the operation expression:

$$\theta_F = \tan^{-1} \frac{Y_P - Y_G}{X_P - X_G}$$

where, ($X_p$, $Y_p$) is the coordinate data obtained from the point data group represented by the pointer-specified address, and ($X_G$, $Y_G$) is the coordinate data on the current position. In step S9, the CPU 14 supplies the display device 18 with the display information signals comprising the point name data, distance data $L_F$ and direction data $\theta_F$ about the key point closest to the current vehicle position, this closest key point having been acquired from the point data group represented by the pointer-specified address, the name of the closest key point being displayed on the display unit 19 along with the distance and direction from the current position with respect to that key point.

In the manner described, the current vehicle position is estimated by use of the output data from the GPS receiver 11. The navigation processing comes to an end when the name of the key point closest to the current position is displayed, along with the distance and direction with respect to that key point.

In the above-described navigation processing, the key point closest to the current vehicle position is detected from among a plurality of key points, and the name of the closest key point is displayed along with the distance and direction with respect to that point. Alternatively, it is possible to detect a plurality of key points close to the current vehicle position, any of these points being selected at will by the user, the name of the user-selected point being displayed together with the distance and direction with respect to that point. This alternative processing procedure will be described below by referring to the flowchart of FIG. 4.

Figure 4:
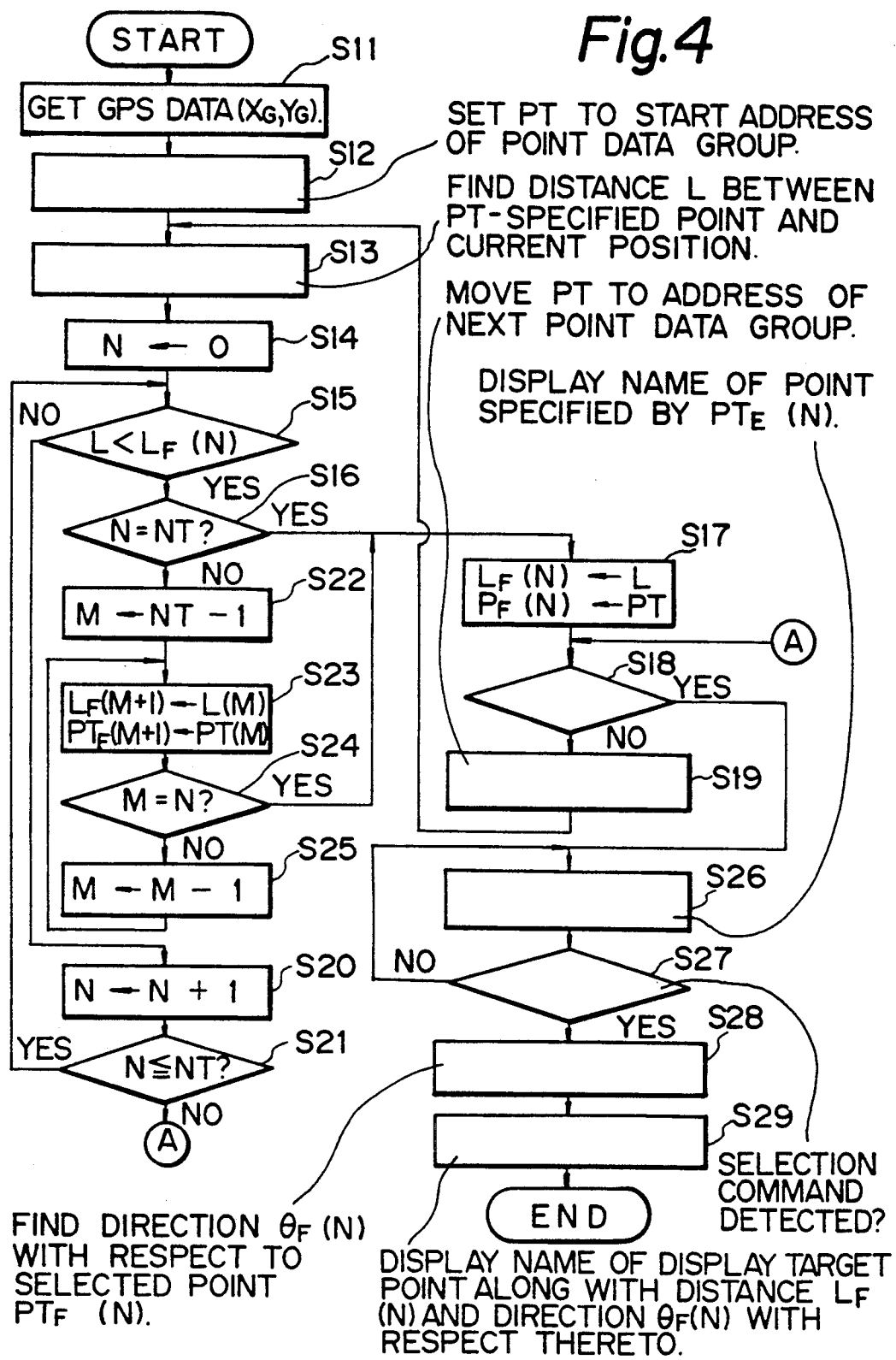
FIG. 4 is a flowchart depicting the steps that the CPU of the embodiment takes in performing another type of navigation processing.

In steps S11 through S13 of FIG. 4, as in steps S1 through S3, the CPU 14 acquires the distance L between the current vehicle position and a key point specified by the pointer. In step S14, the CPU 14 resets a count value N on a counter. In step S15, a check is made to see if the distance L thus acquired is smaller than an initial value $L_F(0)$. If $L < L_F(0)$, another check is made in step S16 to see if the count value N is equal to the number of selected close points NT. Since no key point is selected at this point, NT=0 and N=NT. Thus the CPU 14 stores, in step S17, the address specified by the pointer (PT) as the data about the first selected close key point, into the first storage area of an appropriate register. In step S18, the CPU 14 checks to see if all point data groups have been checked for closeness to the current position. If all point data groups have not been checked, the pointer is moved in step S19 to the address of the next point data group. The CPU 14 then returns to step S13, and the processing is repeated.

If $L \geq L_F(0)$ in step S15, the CPU 14 increments the count value N in step S20. In step 21, a check is made to see if $N \leq NT$. If $N \leq NT$, the CPU 14 goes back to step S15 to check to see if $L < L_F(1)$. That is, this checking process determines if the distance $L_F(N)$ between the current vehicle position and each of the NT close key points already selected is greater or smaller than the distance L obtained this time relative to the current position. If the CPU 14 finds in step S15 that $L < L_F(N)$, another check is made in step S16 to see if N =NT. If N=NT, this means that the distance L obtained this time relative to the current vehicle position is smaller than the distance $L_F$ between the current position and the NT-th close key point. Therefore, in step S17, the CPU 14 places in the appropriate register the data about the key point deemed close this time, replacing the data about the NT-th close key point.

In step S16, if the check has proved that N≠NT, the CPU 14 goes to step S22, where an (NT−1)th storage area is established as a temporary storage area M. What is intended in this phase of processing is to place the data about the NT key points in the appropriate register. In step S23, the key point data already stored in the temporary storage area M is stored into the next storage area (M+1). This causes the data stored in the M-th storage area to be shifted to the (M+1)th storage area, leaving the M-th storage area blank. In step S24, the CPU 14 checks to see if M=N. If M=N, the CPU 14 goes to step S17, placing in the now blank M-th storage area the data about the key point judged this time to be close. If M≠N, the (M−1)th storage area is set as the temporary storage area M in step S25. Step S23 is then reached again, and the processing is repeated. In this manner, the CPU 14 places in the register the data about the NT close key points in order of closeness with respect to the current vehicle position.

In step S18, if it is found that all point data groups have been checked for closeness to the current position, the CPU 14 displays in step S26 the name of the closest key point on the display unit 19. In step S27, a check is made to see if a command to select that key point has come in the form of a key input operation from the key input unit 7. If there is no key input, step S26 is reached again, and the next closest point name is displayed. The process is repeated until a key input is received. Upon key input from the key input unit 7, the CPU 14 selects as the display target point the point whose name is currently displayed. As in steps S8 and S9 of FIG. 3, the CPU 14 obtains the direction $\theta_F$ relative to the display target point in step S28. In step S29, the name of the display target point is displayed on the display unit 19 along with the distance and direction with respect thereto.

In the manner described, the user may retrieve data on a plurality of key points close to the current vehicle position, select any of these points at will, and have the name of the selected point displayed together with the distance and direction with respect thereto.

The above-described two types of navigation processing involve displaying the name of the user-selected key point closest or close to the current vehicle position along with the distance and direction with respect to that point. Alternatively, it is possible for the user to specify as the display target point any of the key points whose data is stored in the memory card 8 so as to get the name of that key point displayed along with the distance and direction with respect thereto. This type of navigation processing will be described below by referring to the flowchart of FIG. 5.

In step S31, the CPU 14 checks to see if a command to change the key point has come in the form of a key input operation from the key input unit 7. If the command is detected, the CPU goes to step S32, setting the pointer to the appropriate first address of the multiple key point data groups stored in the memory card 8. In step S33, the CPU 14 gets the name of the pointer-specified key point displayed on the display unit 19. In step S34, a check is made to see if a key input from the key input unit 7 has produced a command to select the key point whose name is currently displayed. If there is no such command, the CPU 14 moves the pointer to the address of the next key point data group in step S35. Step S33 is then reached again, and the processing is repeated until a key input operation causes the currently displayed key point to be selected.

If the key input has produced a command for selecting the currently displayed key point, the CPU 14 goes to step S36, fixing the pointer to the pointer-specified address of the selected key point. In step S37, the CPU 14 gets from the GPS receiver 11 the longitude information ($X_G$, $Y_G$) representing the current vehicle position. In step S38, as in step S3 of FIG. 3, the CPU 14 obtains the distance L between the current vehicle position and the specified key point. In step S39, as in step SB of FIG. 3, the CPU 14 acquires the direction $\theta_F$ with respect to the specified key point. In step S40, the name of the specified key point is displayed on the display unit 19 along with the distance and direction with respect thereto.

As indicated, the simplified navigation apparatus according to the present invention uses a recording medium that contains beforehand a plurality of geographical point data groups each of which comprises point name data paired with coordinate data on each geographical point. In operation, the coordinate data of a given point is retrieved from among the multiple point data groups stored in the recording medium, and is set as the coordinate data about a display target point. Then the distance and the direction between the display target point and the current vehicle position are acquired. Thereafter, the name of the target point is displayed along with the distance and direction with respect thereto.

Constructed as described, the navigation apparatus according to the invention uses a small-capacity recording medium because there is relatively little data to store therein beforehand, and an inexpensive display device to handle the data. One advantage of this construction is that the apparatus is small in size and low in cost. Another advantage is that because the apparatus displays minimum information required, it is easy for the user to grasp what is displayed. A further advantage is that because it is small, easy to use and and relatively inexpensive, the apparatus may be mounted not only on passenger cars and tracks but also on bicycles and motorcycles; it may even be carried by a person as a portable navigation apparatus.

What is claimed is:

1. A simplified navigation apparatus to be mounted on a vehicle, comprising:
   a global positioning system (GPS) receiver for producing a global coordinate data signal representing the absolute current location of said vehicle;
   reading means for reading from a recording medium carrying thereon a plurality of geographical point data pairs, each data pair consisting of a point name data signal and a geographic coordinate data signal associated with said point name data signal;
   display means for displaying display information signals supplied thereto;
   display point setting means for selecting a geographical point data pair having a geographic coordinate data signal which is closest to said current vehicle position from said plurality of geographical point data pairs and for setting said geographic coordinate data signal as a display target point;

reading control means for controlling said reading means so as to retrieve from said recording medium a point name data signal of the selected geographical point data pair;

computing means for obtaining data regarding distance and direction from said absolute current location of said vehicle up to said display target point on the basis of the coordinate data signals of both of said absolute current location of said vehicle and said display target point; and display control means for supplying said display means with the retrieved point name data signal and the obtained distance data and direction data as said display information signals.

2. A simplified navigation apparatus according to claim 1, further comprising:

point detection means for detecting at least one coordinate data signal from said plurality of point data pairs, said coordinate data signal being close to said current vehicle position;

means for consecutively supplying said display means with a display information signal containing a point name data signal corresponding to the detected coordinate data signal; and input means for inputting a selection command;

wherein the point whose name is currently displayed on said display means is selected as said display target point when said selection command is input via said input means.

3. A simplified navigation apparatus according to claim 1, further comprising:

select means for consecutively selecting said plurality of point data pairs;

means for supplying said display means with the respective point name data signals contained within the consecutively selected point data pairs; and input means for inputting a selection command;

wherein a point whose name is currently displayed on said display means is selected as said display target point when said selection command is input via said input means.

4. A simplified navigation apparatus according to claim 1, wherein said recording medium is removably attached to the body thereof.

* * * * *